(12) United States Patent
Golov (10) Patent No.: US 11,945,452 B2
(45) Date of Patent: *Apr. 2, 2024

(54) DETERMINATION OF RELIABILITY OF VEHICLE CONTROL COMMANDS VIA MEMORY TEST

(71) Applicant: Micron Technology, Inc., Boise, ID (US)

(72) Inventor: Gil Golov, Backnang (DE)

(73) Assignee: Lodestar Licensing Group LLC, Evanston, IL (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/208,612

(22) Filed: Mar. 22, 2021

(65) Prior Publication Data

US 2021/0229684 A1    Jul. 29, 2021

Related U.S. Application Data

(63) Continuation of application No. 15/855,175, filed on Dec. 27, 2017, now Pat. No. 10,981,576.

(51) Int. Cl.
*G05D 1/02*  (2020.01)
*B60W 50/02*  (2012.01)
(Continued)

(52) U.S. Cl.
CPC ....... *B60W 50/0205* (2013.01); *G05D 1/0088* (2013.01); *B60W 2050/021* (2013.01);
(Continued)

(58) Field of Classification Search
CPC ......... B60W 50/0205; B60W 2710/20; B60W 2050/021; B60W 2720/106;
(Continued)

(56) References Cited

U.S. PATENT DOCUMENTS 6,108,598 A    8/2000  Sumitani
7,509,567 B1   3/2009  Kiselev et al.
(Continued)

FOREIGN PATENT DOCUMENTS

CN    104216835    12/2014
EP     2437171     4/2012

OTHER PUBLICATIONS

International Search Report and Written Opinion, Int. App. No. PCT/US2018/052634, dated Jan. 20, 2019.
(Continued)

*Primary Examiner* — Masud Ahmed
(74) *Attorney, Agent, or Firm* — Greenberg Traurig (57) ABSTRACT

A vehicle having a control element for the speed, acceleration or direction of the vehicle, a computing device to generate a command in autonomous driving of the vehicle, and a command controller coupled between the control element and the computing device. In response to the command, the command controller initiates a test of a portion of the memory of the computing device. If the portion of the memory passes the test, the command controller forwards the command for execution via the control element of the vehicle; otherwise, the command controller blocks the command and/or issues a replacement command for the vehicle.

17 Claims, 3 Drawing Sheets

(51) Int. Cl.
*G05D 1/00* (2006.01)
*G06N 3/04* (2023.01)

(52) U.S. Cl.
CPC ... *B60W 2710/20* (2013.01); *B60W 2720/106* (2013.01); *G06N 3/04* (2013.01)

(58) Field of Classification Search
CPC ........ B60W 2050/0005; B60W 50/029; G05D 1/0088; G06N 3/04; B60Y 2302/05
USPC .......................................................... 701/3
See application file for complete search history.

(56) References Cited

U.S. PATENT DOCUMENTS

| | | | |
|---|---|---|---|
| 8,145,822 | B2 | 3/2012 | Hachmann et al. |
| 8,601,321 | B2* | 12/2013 | Feng ................ G01R 31/31719 714/27 |
| 8,751,860 | B2 | 6/2014 | Feeley et al. |
| 9,110,832 | B2 | 8/2015 | Feeley et al. |
| 9,331,989 | B2 | 5/2016 | Dover |
| 9,502,128 | B2 | 11/2016 | Lee |
| 9,533,579 | B2 | 1/2017 | Nomura |
| 9,569,622 | B2* | 2/2017 | Dover ................... G06F 21/575 |
| 9,613,214 | B2* | 4/2017 | Dover ..................... G06F 21/57 |
| 10,431,299 | B2 | 10/2019 | Tokutomi et al. |
| 10,836,402 | B2 | 11/2020 | Golov |
| 10,901,862 | B2 | 1/2021 | Golov |
| 10,933,882 | B2 | 3/2021 | Golov |
| 10,981,576 | B2 | 4/2021 | Golov |
| 11,507,175 | B2 | 11/2022 | Golov |
| 11,691,638 | B2 | 7/2023 | Golov |
| 2006/0212195 | A1 | 9/2006 | Veith et al. |
| 2009/0210777 | A1 | 8/2009 | Weiberle et al. |
| 2012/0102477 | A1 | 4/2012 | Kim et al. |
| 2013/0007345 | A1 | 1/2013 | Barbou-Des-Places et al. |
| 2013/0166866 | A1 | 6/2013 | Yerushalmi et al. |
| 2013/0232366 | A1 | 9/2013 | Nishijima |
| 2014/0075087 | A1 | 3/2014 | Bartling et al. |
| 2014/0140135 | A1 | 5/2014 | Okano et al. |
| 2014/0208151 | A1 | 7/2014 | Fernandez |
| 2014/0229724 | A1 | 8/2014 | Chen et al. |
| 2015/0088358 | A1 | 3/2015 | Yopp |
| 2015/0089287 | A1 | 3/2015 | Jayakumar et al. |
| 2015/0094899 | A1 | 4/2015 | Hackenberg et al. |
| 2015/0280919 | A1* | 10/2015 | Cullen ................. G05D 1/0077 701/3 |
| 2015/0331055 | A1 | 11/2015 | Yuhei et al. |
| 2016/0162422 | A1 | 6/2016 | Weber |
| 2016/0349692 | A1 | 12/2016 | Tomimatsu |
| 2017/0024127 | A1 | 1/2017 | Bazarsky et al. |
| 2017/0075352 | A1* | 3/2017 | Nordbruch ............. G01C 21/36 |
| 2017/0090476 | A1 | 3/2017 | Letwin et al. |
| 2017/0180929 | A1 | 6/2017 | Cavendish et al. |
| 2017/0243484 | A1 | 8/2017 | Li et al. |
| 2017/0300052 | A1 | 10/2017 | Harda et al. |
| 2017/0351968 | A1 | 12/2017 | Bowers et al. |
| 2017/0361712 | A1 | 12/2017 | Terao et al. |
| 2018/0039538 | A1 | 2/2018 | Freikorn et al. |
| 2018/0074718 | A1 | 3/2018 | Lee |
| 2018/0086267 | A1 | 3/2018 | Nix |
| 2018/0203622 | A1 | 7/2018 | Ishiguro |
| 2019/0163367 | A1 | 5/2019 | Bazarsky et al. |
| 2019/0180526 | A1 | 6/2019 | Mehdizade et al. |
| 2019/0193745 | A1 | 6/2019 | Golov |
| 2019/0193746 | A1 | 6/2019 | Golov |
| 2019/0193747 | A1 | 6/2019 | Golov |
| 2019/0317864 | A1 | 10/2019 | Ma |
| 2020/0125441 | A1 | 4/2020 | Omori et al. |
| 2020/0142472 | A1 | 5/2020 | Golov |
| 2020/0151067 | A1 | 5/2020 | Golov |
| 2021/0046944 | A1 | 2/2021 | Golov |
| 2021/0141699 | A1 | 5/2021 | Golov |
| 2021/0163024 | A1 | 6/2021 | Golov |
| 2023/0076311 | A1 | 3/2023 | Golov |

OTHER PUBLICATIONS

International Search Report and Written Opinion, PCT/US2019/058936, dated Feb. 21, 2020.
P. Balasubramanian et al., "A Fault Tolerance Improved Majority Voter for TMR System Architectures", WSEAS Transactions on Circuits and Systems, vol. 15, 2016, pp. 108-122.
RAID, https://en.wikipedia.org/wiki/RAID, printed on Oct. 25, 2018, 11 pages.
Sandeep Kaushik, Yervant Zorian, "Embedded memory test and repair optimizes SoC yields", Jul. 17, 2012.
Backhausen, Ulrich, et al. "Robustness in Automotive Electronics: An Industrial Overview of Major Concerns." IEEE, Jul. 3, 2017.
Humphry, Jonathan, et al. "A Fault-Tolerant/Fail-Safe Command and Control System for Automated Vehicles." IEEE, Mar. 23, 2015.
Tosson, Amr M.S., et al., "8T1R: A Novel Low-power High-speed RRAM-based Non-volatile SRAM Design." 2016 International Great lakes Symposium on VLSI(GLSVLSI), ACM, Aug. 15, 2016.
Wang, Jiachun, "Locomotive CCU Board Design and Development Based on SAMA5D35." China's Excellent Master's Thesis Full-text Database Engineering Science and Technology II, Abstract only, Sep. 15, 2014.

* cited by examiner

DETERMINATION OF RELIABILITY OF VEHICLE CONTROL COMMANDS VIA MEMORY TEST

RELATED APPLICATION

The present application is a continuation application of U.S. patent application Ser. No. 15/855,175, filed Dec. 27, 2017, and entitled "Determination of Reliability of Vehicle Control Commands via Memory Test," the entire disclosure of which application is hereby incorporated herein by reference.

FIELD OF THE TECHNOLOGY

At least some embodiments disclosed herein relates to vehicle control in general and more particularly, but not limited to, the reliability of commands generated by computing devices for autonomous control of vehicles.

BACKGROUND

Recent developments in the technological area of autonomous driving allow a computing system to operate, at least under some conditions, control elements of a vehicle without the assistance from a human operator of the vehicle.

For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

U.S. Pat. App. Pub. No. 2015/0094899, entitled "Method for Driver Assistance System of a Vehicle" and published on Apr. 2, 2015, discloses a method to alert a driver to take control of the vehicle, when the distance between the current location of the vehicle and an end of a route section that has been identified for driving by the computing system is shorter than a threshold. U.S. Pat. App. Pub. No. 2017/0300052, entitled "Handover Notification Arrangement, a Vehicle and a Method of Providing a Handover Notification" discloses a further technique to hand over the control of the vehicle back to a human driver.

U.S. Pat. No. 9,533,579, entitled "Electronic Control Apparatus for Electrically-Driven Vehicle" and published Jan. 3, 2017, discloses an electronic control apparatus of a vehicle that has a self-diagnosis function.

U.S. Pat. No. 8,601,321, entitled "System-on-a-Chip (SoC) Test Interface Security" and published Dec. 3, 2013, discloses a System on Chip (SoC) that, during a time to boot up its processor, reads a memory area storing a scrambled portion of firmware to create a descrambled value for a determination of whether a test interface to access the processor by an external device is authorized.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide a command controller that determines the reliability of a command generated by a computing device for the autonomous driving of a vehicle by testing a portion of the memory of the computing device. The command controller blocks the command and/or initiates an emergency response when the computing device fails the memory test.

For example, when a vehicle uses a system on chip (SoC) to generate a command for an autonomous operation of a vehicle (e.g., steering the wheels of the vehicle, adjusting the speed of a motor of the vehicle, activating the brakes of the vehicle), the command controller determines whether the command can be trusted based on a determination of whether the SoC is damaged. If the SoC is damaged in part, the command generated by SoC is considered unreliable and thus can be blocked for an emergency response.

The health of the memory the SoC may be considered the proxy of the health of the SoC as a whole. When certain areas of the memory of the SoC are damaged, especially the mission critical portions of the memory, the reliability of the SoC in generating commands for autonomous driving is considered compromised. Thus, when the SoC fails a test of a mission critical part of its memory, the command generated by the SoC for autonomous driving may be blocked; and one or more safe-mode commands may be generated to place the vehicle in a safe condition.

For example, a command controller can be configured on a command communication path from the SoC to a control element that effectuates a command from the SoC. The command controller is configured to intercept the command that is issued by the SoC and that affects the operation of the control element of the vehicle. In some instances, the command is directly executed by the control element; and in other instances, the command is further processed by another computing device (e.g., another SoC) to generate control signals or commands for the control element.

In response to intercepting the command from the SoC to the control element, the command controller initiates a memory test on the SoC, preferably testing one or more mission sensitive or critical areas of the memory of the SoC, such as a memory area that stores the software/firmware used for the generation of the command, a memory area that stores the data based on which the command is generated.

If the SoC passes the test of selected areas of its memory, the controller provides the intercepted command to the vehicle for execution or effectuating by the control element; otherwise, the SoC may be considered defective, which causes the command controller to identify the command as being generated in error and prevent the command from reaching the control element, and/or causes the command controller to generate one or more basic replacement commands to place the vehicle in a safe condition.

For example, in response to the SoC failing a memory test, the command controller may request a human operator of the vehicle to take over the control of the vehicle, communicate with a remote server to obtain a replacement command if a suitable communication channel is available, activate an emergency signal of the vehicle, activate a predetermined emergency command or routine for operating the vehicle under emergency conditions (e.g., slowing down the vehicle for a stop).

In some implementations, the command controller is implemented using a computing device external to the SoC using hardware. Preferably, the hardware of the command controller is more reliable and/or durable than the SoC. Alternatively, the command controller may be implemented as part of the SoC in controlling its output using a dedicated hardware circuitry and/or firmware.

Figure 1:
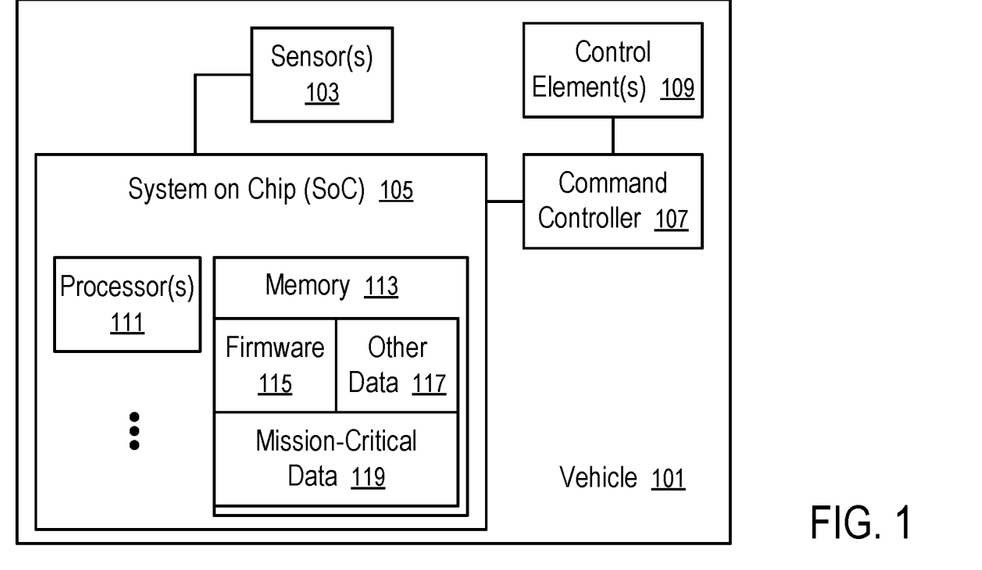
FIG. 1 shows a vehicle having a command controller according to one embodiment.

FIG. 1 shows a vehicle (101) having a command controller (107), a system on chip (SoC) (105), one or more sensors (103), and one or more control elements (109).

In FIG. 1, the command controller (107) has memory (113) and one or more processors (111); and the command controller (107) is coupled between the SoC (105) and the controller element(s) (109) to prevent commands generated by the SoC (105) from reaching the control element(s) (109) when the commands are determined to be unreliable.

In general, the command controller (107) may a self-diagnosis function to evaluate the health state of the SoC (105), including the memory (113) and the processors (111). The result of the self-diagnosis function may be used to determine the reliability of the commands generated by the SoC (105). Preferably, the reliability of the commands or outputs of the SoC (105) is tested (e.g., on a per command basis, or periodically) in real time during autonomous driving based at least in part on the results of testing one or more selected portions of the memory (113).

The SoC (105) of FIG. 1 receives data from the sensor(s) (103) and executes, using its processor(s) (111), firmware (115) stored in the memory (113) to generate commands affecting the control element(s) (109) that can effectuate the autonomous driving of the vehicle (101). For example, the sensor(s) (103) may include a visible light camera, an infrared radiation camera, a lidar (Light Detection And Ranging), a radar (RAdio Detection And Ranging), etc.

The processor(s) (111) and the memory (113) of the SoC (105) are typically sealed inside a same integrated circuitry package. However, the processor(s) (111) and the memory (113) may or may not be formed on a single silicon substrate.

When the SoC (105) has a damaged circuitry (e.g., processor(s) (111)), it is likely that the memory (113) of the SoC (105) is also damaged. When a portion of the memory (113) storing the firmware (115) and/or mission-critical data (119) for the execution of the firmware (115) is determined to be damaged after the generation of a command, it is likely that the command is an erroneous result of the execution of the firmware (115). Thus, the memory testing result of the SoC (105) can be used as a proxy indicator of the health of the SoC (105) and be assessed in real time during autonomous driving.

In general, the SoC (105) may also receive inputs from other computing devices (not shown in FIG. 1) that are configured on the vehicle (101), such as an input or a command from another SoC that provides a prepossessing result of the sensor(s) (103) or another sensor (not shown in FIG. 1).

Similarly, the command or output generated by the SoC (105) may also be used as an input to other computing devices, such as another SoC, which post-processes the command or output of the SoC (105) to drive the control element(s) (109).

For example, the vehicle (101) may be configured as a car or automobile driven by an electric motor or an internal combustion engine. The control element(s) (109) may include a brake of the vehicle (101), an acceleration control of the vehicle (101), a steering control of the vehicle (101), a turn signal of the vehicle control (101), etc.

For improved reliability, the testing of the health of the SoC (105) is performed in real time in response to the command or output generated by the SoC (105), especially when the command or output has an impact on the operation of the control element(s) (109).

Performing a complete diagnosis of the SoC (105) may be time consuming and, if performed on a per command basis, may cause unacceptable delay in providing the command/output from the SoC (105) to the control element(s) (109). Optionally, a complete diagnosis of the SoC (105) may be performed during certain time periods (e.g., when the vehicle (101) is in a parking mode, during the startup of the vehicle) but not performed during the time period of active driving to avoid interference with the autonomous driving function of the SoC (105).

Preferably, the command controller (107) initiates a test of a mission critical portion of the memory (113) to balance the need for reliability check in the commands/outputs from the SoC (105) and the need to avoid excessive delay in the propagation of the commands/outputs from the SoC (105) to the control element(s) (109).

The mission critical portion of the memory (113) may include the portion storing the firmware (115) for instructing the processor(s) (111) to perform computations that result in the generation the commands/outputs of the SoC (105) and/or the portion of the memory (113) that stores the mission-critical data (119) used in generation of the commands/outputs of the SoC (105). Examples of the mission-critical data (119) include the synaptic weights of an artificial neural network for the recognition of an event or object captured by the sensor(s) (103) and/or for the generation of the driving decision responsive to the recognition of the event or object.

The memory (113) may include a portion that stores other data (117) that are not used to generate the commands/outputs of the SoC (105) and/or a portion that does not currently store any valid data when the SoC (105) outputs its command or control signals. The command controller (107) may skip the testing of such a portion of the memory (113) of the SoC (105).

The mission critical portion of the memory (113) may be are predefined. For example, the modules of a firmware (115) and the mission-critical data (119) for the generation of one command may be configured to be stored in a predefined area of the memory (113). The predefined area may be identified by one or more blocks of physical addresses or logical addresses. In response to the detection of a command in the output of the SoC (105), the predefined area of the memory (113) is tested as a proxy of the health of the SoC (105). The mission critical portion of the memory (113) may be selected based on the type of the commands/outputs generated by the SoC (105), in accordance with the identification of modules and data items responsible for the generation of the type of the commands/outputs.

Alternatively or in combination, a randomly selected portion of the memory (113) may be tested, where the test result is used as a health proxy of the SoC (105) as a whole.

The SoC (105) is optionally configured with a circuit for self-testing a portion of its memory (113). The circuit is activated by the command controller (107) to generate a test result in response to a command/output being generated by the SoC (105). In some instances, the function of the self-testing circuit is alternatively implemented by, at least in part, the processor(s) (111) executing a module of the firmware (115).

Alternatively, the command controller (107) may communicate through a test interface of the SoC (105) to access the memory (113) to perform the test of a selected portion of the memory (113) of the SoC (105).

In some instances, the function of the system on chip (105) is not implemented in a single integrated circuit chip. For example, more than one integrated circuit chip may be used to implement the function of the SoC (105) illustrated in FIG. 1. When the components for implementing the function of the system on chip (105) are located close to each other, the memory test can also be used to indicate the health of the components as a whole.

In some instances, the command controller (107) is implemented as a system on chip or an on-board computer of the vehicle (101). Alternatively, the command controller (107) may be integrated within the SoC (105).

Figure 2:
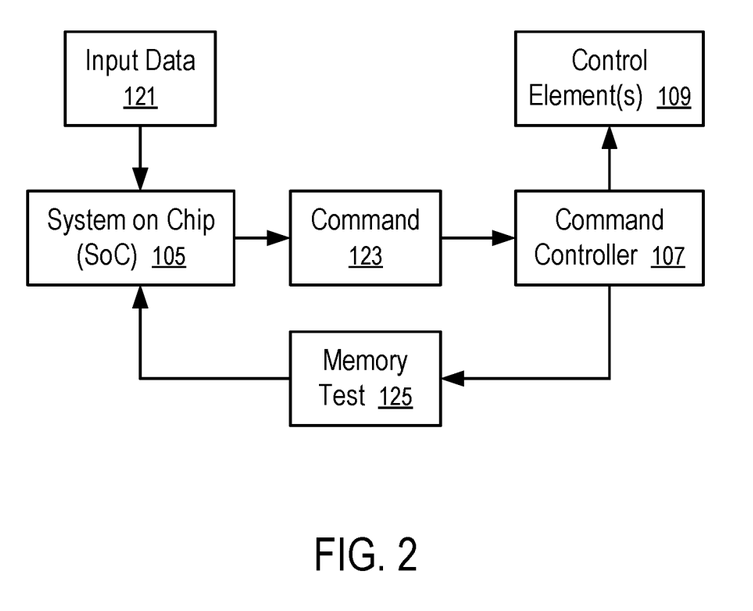
FIG. 2 illustrates the operations of a command controller to check the reliability of commands from a computing device of a vehicle according to one embodiment.

FIG. 2 illustrates the operations of a command controller to check the reliability of commands from a computing device of a vehicle according to one embodiment. For example, the operations illustrated in FIG. 2 can be implemented in a vehicle (101) illustrated in FIG. 1 or in another system.

In FIG. 2, the SOC (105) receives input data (121) to generate a command (123) that affects or controls the operation of the control element(s) (109).

The command controller (107) intercepts the command (123) on the communication path from the SoC (105) to the control element(s) (109).

In response to such a command (123), the command controller (107) generates or initiates a memory test (125).

In some implementations, the memory test (125) is for a predetermined area of the memory (113) of the SoC (105), independent on the command (123).

In other implementations, the command controller (107) selects the area of the memory (113) for the memory test (125) based on the content of the command (123).

For example, based on a type of the command (123), the command controller (107) identifies the modules of the firmware (115) that are used for the generation of the command (123) and performs, or requests, the memory test (125) of the portion of the memory (113) that stores the identified modules of the firmware (115).

For example, based on a type of the command (123), the command controller (107) identifies the data components (e.g., 119) that are used for the generation of the command (123) and performs, or requests, the memory test (125) of the portion of the memory (113) that stores the identified data components (115).

In some instances, the firmware (115) and/or the mission-critical data (119) are stored with redundancy and/or parity data that enables the testing of the health of the portion(s) of the memory (113) storing the firmware (115) and/or the data (119), without performing write operations in the tested portion(s) of the memory (113) of the SoC (105).

Figure 3:
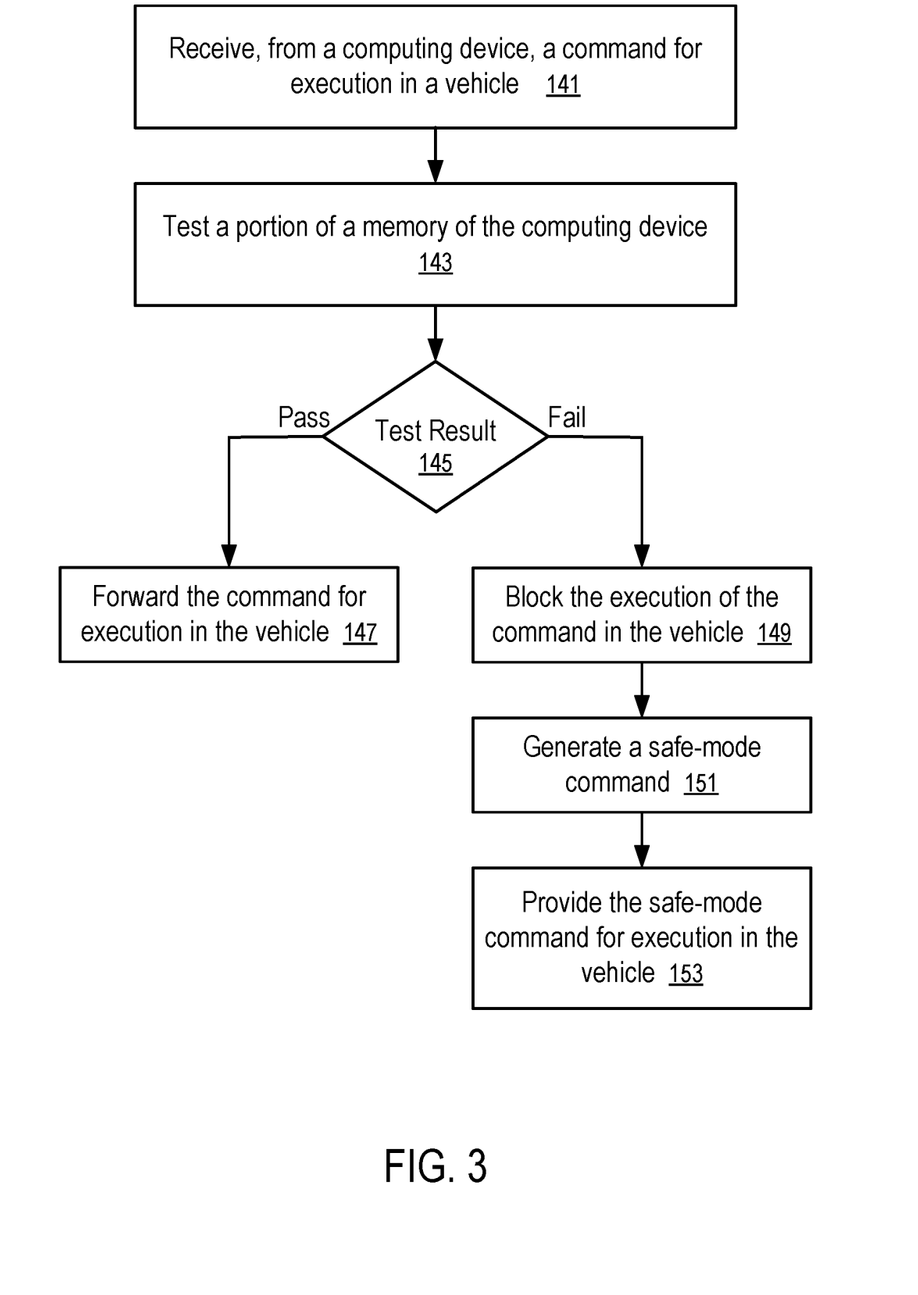
FIG. 3 shows a method to process a command from a computing device of a vehicle according to one embodiment.

FIG. 3 shows a method to process a command from a computing device of a vehicle according to one embodiment. For example, the method of FIG. 3 can be implemented in the vehicle (101) of FIG. 1 to perform operations illustrated in FIG. 2.

The method of FIG. 3 includes: receiving (141), from a computing device (e.g., SoC (105)), a command (123) for execution in a vehicle (101); testing (143) a portion (e.g., 115 and 119) of a memory (113) of the computing device (e.g., SoC (105)); determining (145) from the test result whether the memory (113) of the computing device (e.g., SoC (105) has passed the test (125) or failed the test (125); and, if it is determined (145) that the memory (113) has passed the test (125), forwarding (147) the command (123) for execution in the vehicle (101).

If it is determined (145) that the memory (113) has failed the test (125), the method of FIG. 3 further includes: blocking (149) the execution of the command (123) in the vehicle (101); generating (151) a safe-mode command; and providing (153) the safe-mode command for execution in the vehicle (101).

Figure 4:
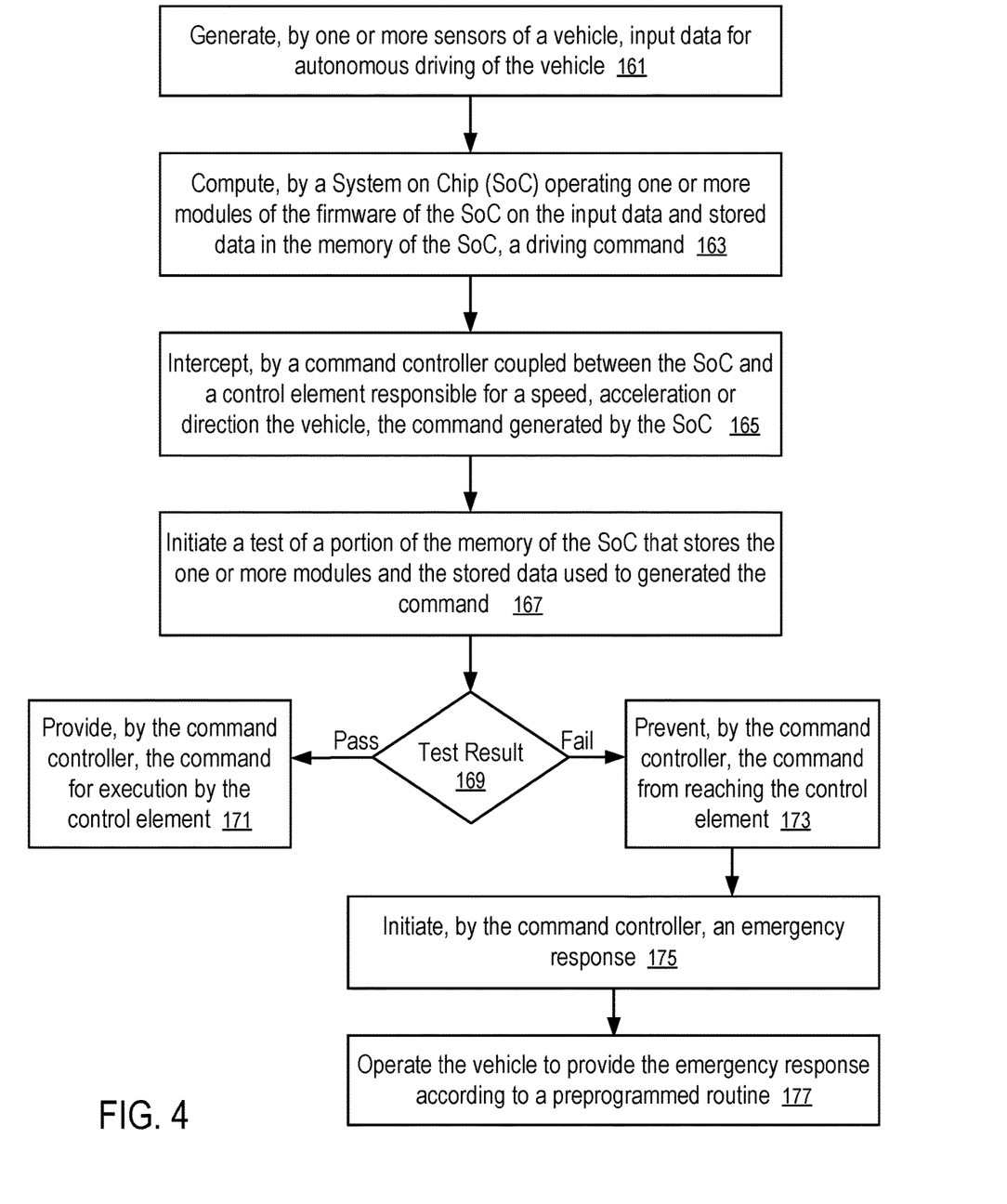
FIG. 4 shows a detailed method to enhance the reliability of a vehicle having an autonomous driving function according to one embodiment.

FIG. 4 shows a detailed method to enhance the reliability of a vehicle having an autonomous driving function according to one embodiment. For example, the method of FIG. 4 can be implemented in the vehicle (101) of FIG. 1 to perform operations illustrated in FIG. 2.

The method of FIG. 4 includes: generating (161), by one or more sensors (103) of a vehicle (101) (e.g., a visible light camera, an infrared camera, a sonar, a radar, a lidar), input data (121) for/during autonomous driving of the vehicle (101); computing (163), by a System on Chip (SoC) (105) operating one or more modules of the firmware (115) of the SoC (105) on the input data (121) and stored data (119) in the memory (113) of the SoC (105), a driving command (123); intercepting (165), by a command controller (107) coupled between the SoC (105) and a control element (109) responsible for a speed, acceleration or direction the vehicle (101) (e.g., an accelerator, a brake, a steering mechanism of the vehicle), the command (123) generated by the SoC (105); initiating (167) a test (125) of a portion of the memory (113) of the SoC (105) that stores the one or more modules and the stored data (119) used to generated the command (123); determining (145) from the test result whether the portion of the memory (113) of the computing device (e.g., SoC (105) has passed the test (125) or failed the test (125); and, if the portion of the memory (113) of the computing device (e.g., SoC (105) has passed the test (125), providing (171), by the command controller (107), the command (123) for execution by the control element (109).

If the portion of the memory (113) of the computing device (e.g., SoC (105) has failed the test (125), the method of FIG. 4 further includes: preventing (173), by the command controller (107), the command (123) from reaching the control element (109); initiating (175), by the command controller (107), an emergency response; and operating (177) the vehicle (101) to provide the emergency response according to a preprogrammed routine.

For example, the emergency response may include: requesting a human operator of the vehicle (101) to take control of the vehicle (101); starting a preprogrammed emergency response routine to place the vehicle (101) in a safe condition; and/or reducing the speed of the vehicle (101) for a stop.

In some instances, the portion of the memory (113) that is being tested (125) is identified based on a type of the command (123). Based on the type of the command (123), the command controller (107) and/or the SoC (105) identifies the modules of the firmware (115) responsible for outputting the command (123) and its associated data (119) responsible for outputting the command (123). The portion of the memory (113) being tested is identified to exclude, from the test (125), a portion of the memory (113) that is not used, or stores other data (117) that are not responsible for outputting the command (123), or stores other modules of the firmware (115) that are not responsible for outputting the command (123).

In some implementations, the command controller (107) is external to the SoC (105) that is sealed in an integrated circuit package. Alternatively, the command controller (107) may be part of the SoC (105), implemented via the processor(s) (111) executing a module of the firmware (115) and/or implemented via a hardware circuitry.

The SoC (105) may include a memory test circuitry that performs the test (125) in response to a request from the command controller (107).

The present disclosure includes methods and apparatuses which perform these methods, including data processing systems which perform these methods, and computer readable media containing instructions which when executed on data processing systems cause the systems to perform these methods.

The SoC (105), the command controller (107) and/or the computer system for the autonomous driving of the vehicle (101) can be implemented as one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving input data from at least one sensor configured on a vehicle;
   receiving, from a computing device configured on the vehicle, a command for operations of a control element of the vehicle, the command based on the input data,
   in response to the command,
     initiating a test of a portion of a memory of the computing device; and
     determining whether the portion of the memory passes the test, wherein the portion of the memory is identified based on a type of the command;
     forwarding the command for execution, in response to a determination that the portion of the memory passes the test; and
     preventing the command from being executed, in response to a determination that the portion of the memory fails the test.

2. The method of claim 1, wherein the at least one sensor includes at least one of:
   a camera;
   an infrared camera;
   a sonar;
   a radar; and
   a lidar.

3. The method of claim 2, wherein the computing device generates commands for autonomous driving of the vehicle.

4. The method of claim 2, wherein the operations of the control element control at least one of:
   acceleration of the vehicle;
   speed of the vehicle; and
   direction of the vehicle.

5. The method of claim 1, wherein the portion of the memory stores the firmware and data used in generating the command.

6. The method of claim 5, wherein a portion of the memory that is not included in the test does not store:
   instructions for the generation of the command; and
   data that has impact on the generation of the command.

7. The method of claim 1, further comprising:
   in response to the determination that the portion of the memory fails the test, generating a replacement command of the received command.

8. The method of claim 7, wherein the replacement command is configured to perform at least one of:
   requesting a human operator of the vehicle to take control of the vehicle;
   starting a preprogrammed emergency response routine to place the vehicle in a safe condition; and
   reducing the speed of the vehicle for a stop.

9. A vehicle, comprising:
   a control element;
     a computing device to generate a command in autonomous driving of the vehicle, the command generated based on input data received from at least one sensor configured on the vehicle, the command to be effectuated by the control element of the vehicle; and
   a command controller coupled between the control element and the computing device, wherein in response to the command, the command controller:
     initiates a test of a portion of a memory of the computing device;
     determines whether the portion of the memory passes the test, wherein the portion of the memory is identified based on a type of the command; and
     based on a result of the test, performs one of:
       forwarding the command for execution, in response to a determination that the portion of the memory passes the test; and
       preventing the command from being executed, in response to a determination that the portion of the memory fails the test.

10. The vehicle of claim 9, wherein the computing device is sealed in one integrated circuit package for a system on chip.

11. The vehicle of claim 10, wherein the command controller is external to the system on chip.

12. The vehicle of claim 10, wherein the computing device includes a memory test circuitry that performs the test in response to a request from the command controller.

13. The vehicle of claim 9, wherein the at least one sensor includes at least one of:
   a camera;
   an infrared camera;
   a sonar;
   a radar; and
   a lidar.

14. The vehicle of claim 13, wherein the control element adjusts at least one of:
   acceleration of the vehicle;
   speed of the vehicle; and
   direction of the vehicle.

15. The vehicle of claim 9, wherein the portion of the memory is identified based on a type of the command for storing:
   one or more modules of the firmware used to generate the command; and
   data used in generating the command.

16. The vehicle of claim 9, wherein the command controller generates a replacement command of the received command in response to the determination that the portion of the memory fails the test.

17. A non-transitory computer storage medium storing instructions which when executed by a controller of a vehicle causes the controller to perform a method, the method comprising:
- receiving input data from at least one sensor configured on the vehicle;
- receiving, from a computing device configured on the vehicle, a command for operations of a control element of the vehicle, the command based on the input data;
- in response to the command,
  - initiating a test of a portion of the memory of the computing device; and
- based on a result of the test, performing one of:
  - forwarding the command for execution, in response to a determination that the portion of the memory passes the test, wherein the portion of the memory is identified based on a type of the command; and
  - preventing the command from being executed, in response to a determination that the portion of the memory fails the test.

* * * * *